United States Patent
Karaoguz et al.

(10) Patent No.: US 8,413,180 B2
(45) Date of Patent: Apr. 2, 2013

(54) MEDIA PROCESSING SYSTEM COMMUNICATING ACTIVITY INFORMATION TO SUPPORT USER INTERACTION DURING MEDIA BROADCASTS

(75) Inventors: Jeyhan Karaoguz, Irvine, CA (US); James D. Bennett, Laguna Beach, CA (US)

(73) Assignee: Broadcom Corporation, Irvine, CA (US)

(*) Notice: Subject to any disclaimer, the term of this patent is extended or adjusted under 35 U.S.C. 154(b) by 2553 days.

(21) Appl. No.: 10/675,358

(22) Filed: Sep. 30, 2003

(65) Prior Publication Data
US 2004/0117837 A1 Jun. 17, 2004

Related U.S. Application Data

(60) Provisional application No. 60/478,287, filed on Jun. 13, 2003, provisional application No. 60/432,472, filed on Dec. 11, 2002, provisional application No. 60/443,894, filed on Jan. 30, 2003.

(51) Int. Cl.
*H04H 60/32* (2008.01)
(52) U.S. Cl. .............................. 725/14; 725/9
(58) Field of Classification Search ............... 725/14, 725/9, 23, 46, 58, 32
See application file for complete search history.

(56) References Cited

U.S. PATENT DOCUMENTS

| | | | | |
|---|---|---|---|---|
| 5,857,190 | A * | 1/1999 | Brown | 707/10 |
| 6,774,926 | B1 * | 8/2004 | Ellis et al. | 725/133 |
| 6,813,775 | B1 * | 11/2004 | Finseth et al. | 725/46 |
| 7,065,778 | B1 * | 6/2006 | Lu | 725/98 |
| 7,103,905 | B2 * | 9/2006 | Novak | 725/46 |
| 2003/0066068 | A1 * | 4/2003 | Gutta et al. | 725/9 |
| 2003/0115585 | A1 * | 6/2003 | Barsness et al. | 725/9 |
| 2004/0250285 | A1 * | 12/2004 | Murphy et al. | 725/75 |

* cited by examiner

*Primary Examiner* — Scott Beliveau
*Assistant Examiner* — Jeremy Duffield
(74) *Attorney, Agent, or Firm* — Garlick & Markison

(57) ABSTRACT

In an embodiment of the present invention, a first user may associate a second user with particular media characteristics. The second user may be notified when the first user consumes media having pre-defined characteristics matching those associated with the second user. The second user may keep records of the consumption of media with particular media characteristics, and may provide services or incentives to the first user. A system in accordance with various aspects of the present invention may comprise a first and a second set top box, each having storage with an associated network address. A user of the second set top box may have at least one associated media characteristic, and the second user may be sent a notification when the first user requests media with pre-defined characteristics matching the media characteristic associated with the second user.

30 Claims, 15 Drawing Sheets

Activity Groups List

| User | Group | Group Members | Start Time | Stop Time | Channel Type | Language | Keywords | Mode |
|---|---|---|---|---|---|---|---|---|
| Dad | Golf Groupies | Golf Friend 1, Golf Friend 2 | 8:00 AM | 12:00 AM | Sports | English | "Arnold Palmer" | Video-All |
| Dad | Investment | Dad | 7:00 PM | 11:00 PM | Financial | English | "Biotech" | All |
| Son | Skateboarders | Son's Friend | 12:00 PM | 2:00 AM | Sports | English | "Tony Hawk" | Video-All |
| Dad | Family | Dad, Brother | 12:00 AM | 11:59 PM | Personal | English | | All |
| | | | | | | | | |
| | | | | | | | | |
| | | | | | | | | |

| CHANNEL LINE UP | HOUR, DAY ||||
| --- | --- | --- | --- | --- |
| | <<1PM | 2PM | ... | 6PM | 7PM>> |
| FAMILY VACATIONS | | | | | |
| KID's SPORTS | | | | | |
| ... | | | | | |
| VACATION in ALASKA VIDEO  802 | Normal Estimated Delivery Time: 2 hrs 13 min  Cost: 59c (without Queuing) | | Showing All Day (48 Min), Earliest Order Time: 4:00PM MPEG-2 1.5 Mbps | |
| VACATION in ALASKA VIDEO  803 | Express Estimated Delivery Time: 18 min  Cost: $1.2 (with Queuing) | | Showing All Day (48 Min), Earliest Order Time: 4:00PM MPEG-2 4 Mbps | |
| VACATION in ALASKA VIDEO  804 | Overnight Delivery: Avail Nxt Morning  Cost: 5c (Server Stored) | | Showing All Day (48 Min), Earliest Order Time: 4:00PM MPEG-2 19 Mbps | |

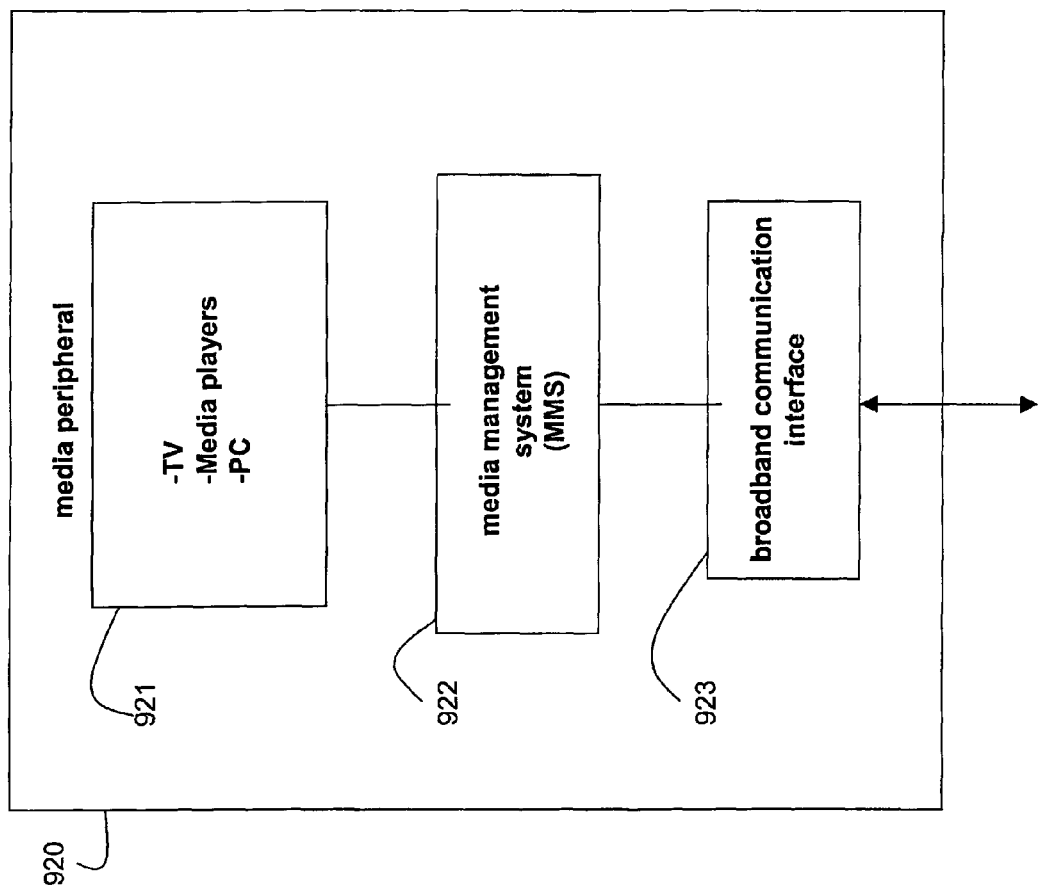

MEDIA PROCESSING SYSTEM COMMUNICATING ACTIVITY INFORMATION TO SUPPORT USER INTERACTION DURING MEDIA BROADCASTS

CROSS-REFERENCE TO RELATED APPLICATIONS/INCORPORATION BY REFERENCE

This application makes reference to, claims priority to, and claims the benefit of U.S. Provisional Patent Application 60/478,287, entitled "Media Processing System Communicating Activity Information To Support User Interaction During Media Broadcasts", filed Jun. 13, 2003, U.S. Provisional Application Ser. No. 60/432,472, entitled "Personal Inter-Home Media Exchange Network", filed Dec. 11, 2002, and U.S. Provisional Application Ser. No. 60/443,894, entitled "Personal Access And Control Of Media Peripherals On A Media Exchange Network", filed Jan. 30, 2003, the complete subject matter of which are hereby incorporated herein by reference, in their entirety.

In addition, the applicants hereby incorporate the complete subject matter herein by reference, in their entirety, of U.S. Provisional Patent Application Ser. No. 60/448,705, entitled "Media Exchange Network With Media Guide Interface", filed Feb. 18, 2003, U.S. Provisional Patent Application Ser. No. 60/457,179, entitled "Server Architecture Supporting A Personal Media Exchange Network", filed Mar. 25, 2003, U.S. patent application Ser. No. 10/657,390, entitled "Personal Inter-Home Media Exchange Network", filed Sep. 8, 2003, and U.S. patent application Ser. No. 10/660,267, entitled "Personal Access And Control Of Media Peripherals On A Media Exchange Network", filed Sep. 11, 2003.

FEDERALLY SPONSORED RESEARCH OR DEVELOPMENT

[Not Applicable]

SEQUENCE LISTING

[Not Applicable]

MICROFICHE/COPYRIGHT REFERENCE

[Not Applicable]

BACKGROUND OF THE INVENTION

Frequently, the enjoyment of video and audio entertainment is a solitary experience. An individual chooses a program of interest and listens to or watches the presentation unaware of who among their co-workers, friends, family, and even those within the same house might also be listening to or watching the same presentation. On special occasions, groups of people will gather to view a program of particular interest, such as an important sports event, if the distance to the viewing location is reasonable. Attendance is limited to the those invited, and generally only those invitees are able to take part in person.

Occasionally, someone viewing or listening to a program may telephone a friend or relative known to have a special interest in the program being broadcast to let them know that it is on, or to exchange commentary about specific portions or events. The telephone instrument used may or may not be in the same location as the viewing/listening device, sometimes forcing the originating party to make the additional effort to leave the program and go to the telephone to contact the other person. Any separation of the telephone from the viewing/listening location influences the amount of time spent on the call, and influences the length of the interaction, and the enjoyment experienced in contacting the other party.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention may be found in a method of communicating activity information to support user interaction in a communication network. Such a method may comprise accepting from a first user information identifying at least a second user, receiving from the first user at least one user-selected characteristic associated with media, and processing a media request from the first user, via a communication network, the requested media having a pre-defined set of characteristics. The method may comprise notifying the at least a second user, via the communication network, of the consumption of the requested media by the first user, if the pre-defined set of characteristics for the requested media matches the at least one user-selected characteristic. In addition, the method may comprise refraining from notifying the at least a second user, via the communication network, of the consumption of the requested media by the first user, if the pre-defined set of characteristics for the requested media does not match the at least one user-defined characteristic.

In an embodiment in accordance with the present invention, each of the first user and the at least a second user may be associated with at least one of an Internet protocol (IP) address, a media access control (MAC) address, and an electronic serial number (ESN). The communication network may comprise at least one of a cable infrastructure, a satellite network infrastructure, a digital subscriber line (DSL) infrastructure, an Internet infrastructure, an intranet infrastructure, a wired infrastructure, and a wireless infrastructure, and the communication network may be the Internet. The requested media may comprise at least one of audio, a still image, video, real time video, and data, and consumption may comprise at least one of playing audio, displaying a still image, displaying video, and displaying data.

In various embodiments of the present invention, the information identifying at least a second user may comprise a legal name, a given name, a screen name, a user identifier, a network identifier, an Internet protocol (IP) address, a media access control (MAC) address, and an electronic serial number. The at least one user-defined characteristic may comprise at least one of a title keyword, a subject keyword, a genre, an artist, a time period, a media channel type, a mode, and a language, and the notifying may comprise transmitting a message via the communication network. An embodiment of the present invention may also comprise keeping a record of the notification, and the record may be used by the second user to provide at least one of services and incentives to the first user.

Additional aspects of the present invention may be seen in a method of communicating activity information to support user interaction in a communication network. An embodiment in accordance with the present invention may comprise associating at least one media characteristic with a user, and processing a request for media from the user, the media having a pre-defined set of characteristics. An embodiment may comprise sending a notification via a communication network if the pre-defined set of characteristics for the requested media matches the at least one media characteristic. In addition, an embodiment of the present invention may comprise refraining from sending a notification if the pre-defined set of characteristics for the requested media does not match the at least one media characteristic. The requested media may comprise at least one of audio, a still image, video, real time video, and data, and the at least one media characteristic may comprise at least one of a title keyword, a subject keyword, a genre, an artist, a time period, a media channel type, a mode, and a language. The pre-defined set of characteristics may comprise at least one media characteristic. In addition, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure.

Further aspects of the present invention may be observed in a system supporting the communication of activity information to support user interaction in a communication network. Such a system may comprise a first storage, at a first location, having an associated first network address, and a first set top box circuitry at the first location, the first set top box circuitry communicatively coupled to the first storage to support consumption of media by a first user. An embodiment of the present invention may comprise a second storage, at a second location, having an associated second network address, and a second set top box circuitry at the second location, the second set top box circuitry communicatively coupled to the second storage to support consumption of media by a second user. In addition, an embodiment in accordance with the present invention may comprise at least one media characteristic associated with the second user, and server software. The server software may receive a request that identifies at least the associated first network address and media having at least one pre-defined characteristic, and may notify, via a communication network, the associated second network address if the at least one media characteristic matches the at least one pre-defined characteristic.

The media in an embodiment of the present invention may comprise at least one of audio, a still image, video, real time video, and data, and the associated first and second network addresses may be one of an Internet protocol (IP) address, a media access control (MAC) address, and an electronic serial number (ESN). Consumption may comprise at least one of playing audio, displaying a still image, displaying video, and displaying data. In addition, the communication network may comprise at least one of a cable infrastructure, a satellite network infrastructure, a digital subscriber line (DSL) infrastructure, an Internet infrastructure, an intranet infrastructure, a wired infrastructure, and a wireless infrastructure. In an embodiment of the present invention, the server software may be at a location separate from the first home and the second home. The at least one media characteristic may comprise at least one of a title keyword, a subject keyword, a genre, an artist, a time period, a media channel type, a mode, and a language. The at least one pre-defined characteristic may comprise at least one of a title keyword, a subject keyword, a genre, an artist, a time period, a media channel type, a mode, and a language.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1C illustrates an exemplary activity groups list screen showing the activity groups defined for several users of an MPS such as the MPS of FIG. 1A, in accordance with an embodiment of the present invention.

FIG. 8 is an exemplary illustration of a media guide user interface showing several options of a pushed media in accordance with an embodiment of the present invention.

FIG. 9B illustrates an alternative embodiment of a media processing system (MPS) in accordance with various aspects of the present invention.

DETAILED DESCRIPTION OF THE INVENTION

Certain embodiments of the present invention relate to the simultaneous enjoyment of media channel content by a group of users. In particular, certain embodiments of the present invention enable a spatially diverse group of users to be made aware of and engage in an interactive group media experience in a media exchange network.

Figure 1A:
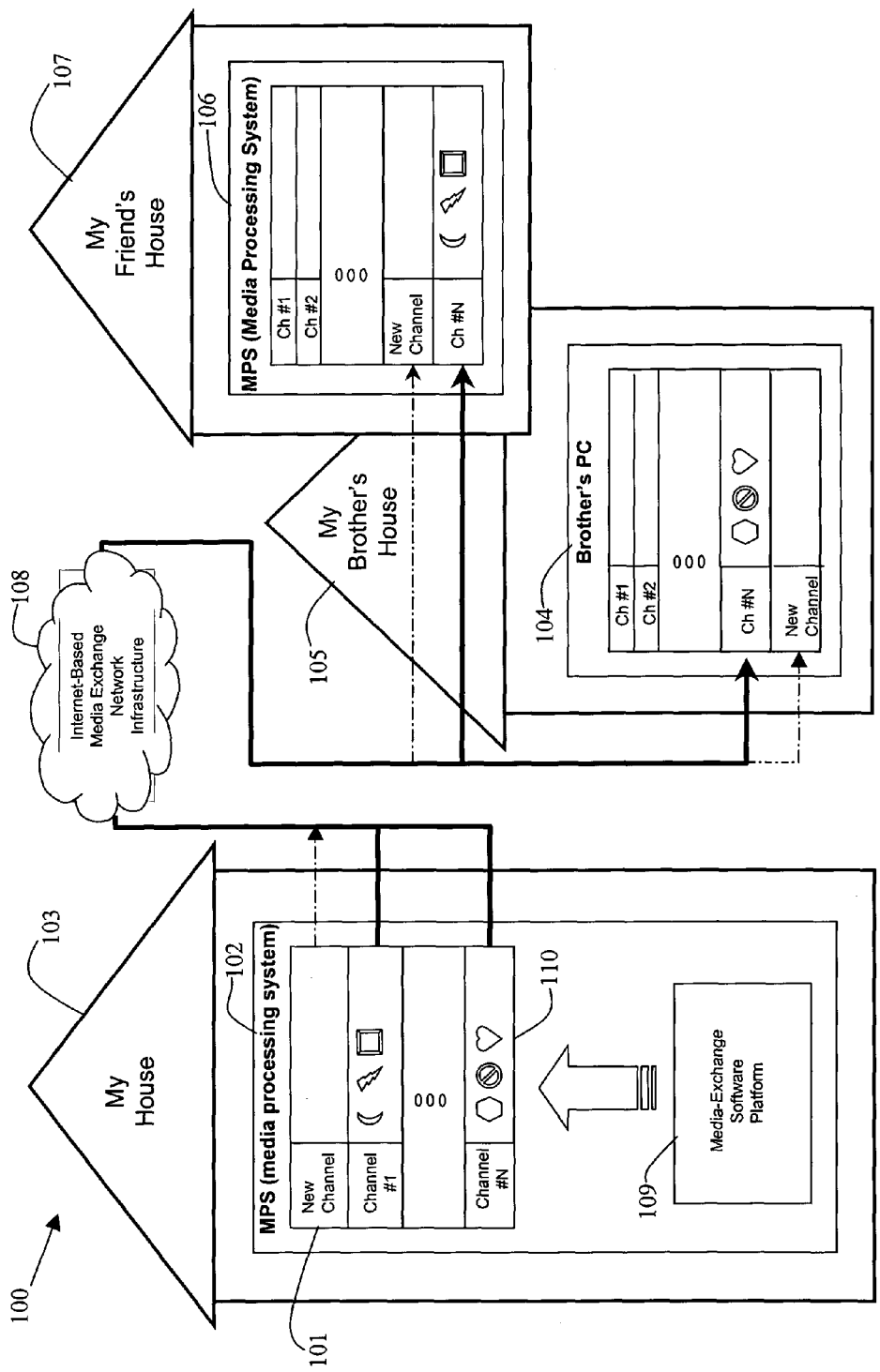
FIG. 1A is a diagram illustrating a first embodiment of a media exchange network supporting the communication of user activity information among users at multiple locations on a media exchange network, in accordance with various aspects of the present invention.

FIG. 1A is a diagram illustrating a first embodiment of a media exchange network 100 supporting the communication of user activity information among users at multiple locations 103, 105 and 107 on a media exchange network 100, in accordance with various aspects of the present invention. Specifically, the media exchange network 100 is a communication network comprising a MPS (media processing system) 102 at "My House" 103, a brother's PC 104 at "My Brother's House" 105, and a MPS 106 at "My Friend's House" 107. The media exchange network 100 further comprises the Internet-based media exchange network infrastructure 108 which connects together the MPS 102, the PC 104, and the MPS 106. In various embodiments of the present invention, the media exchange network 100 may comprise, for example, cable infrastructure, a satellite network infrastructure, a digital subscriber line (DSL) infrastructure, an Internet infrastructure, an intranet infrastructure, a wired infrastructure, and a wireless infrastructure, or any combination of the above. Note that the use labels such as "My House", "My Brother's House", etc., are for illustrative purposes only, and do not represent a limitation of the present invention. The media exchange network 100 may also contain a variety of other sources of media channel content connected to Internet-base media exchange network infrastructure 108 that are not shown in FIG. 1A including, for example, $3^{rd}$ party media providers, $3^{rd}$ party service providers, $3^{rd}$ party sales providers, and $3^{rd}$ party broadcast channel providers. Entities within the media exchange network 100 may be identified using a network or protocol address such as, for example, an Internet protocol (IP) address, a media access control (MAC) address, and an electronic serial number (ESN).

The MPS's (102 and 106) may be, for example, enhanced set-top-boxes. The MPS's (102 and 106) may each include a TV screen (not shown) for viewing and interacting with various user interfaces, media, data, and services that are available on the media exchange network 100 using, for example, a remote control (not shown). The PC 104 may include a PC monitor (not shown) for viewing and interacting with various user interfaces, media, data, and services that are available on the media exchange network using, for example, a keyboard and mouse (both not shown). The MPS's 102 and 106, and the PC 104 include functional software to support interaction with the various elements of the media exchange network 100, in accordance with various embodiments of the present invention.

In accordance with various embodiments of the present invention, a MPS may comprise a set-top-box (STB), a PC, or a TV with a media management system (MMS). A MMS is also known herein as a media exchange software (MES) platform.

A MMS comprises a software platform operating on at least one processor to provide certain functionality including user interface functionality, distributed storage functionality, and networking functionality. For example, a MMS may provide control of media peripheral devices, status monitoring of media peripheral devices, and inter-home MPS routing selection, in accordance with an embodiment of the present invention.

For example, the MPS 102 comprises a media exchange software (MES) platform 109. The MES platform 109 on the MPS 102 supports personalized views of media channels and set up of new media channels on the media exchange network 100. For example, the MES platform 109 provides a format, displayed on a monitor of the MPS 102, known as a media guide user interface 110 to allow a user to set up a personalized view of the media guide user interface 110 using a remote control. An example media guide user interface is described in U.S. Provisional Patent Application Ser. No. 60/448,705, entitled "Media Exchange Network With Media Guide Interface", filed February 18, the complete subject matter of which is hereby incorporate herein in its entirety. The MES platform 109 also provides the functionality for a user of the MPS 102 to set up a new media channel 101 in his/her personalized view.

In general, the MPS's 102 and 106 and the PC 104 each include a media exchange software (MES) platform and a networking component for connectivity. The MES platform provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface with a TV channel guide look-and-feel.

Figure 1B:
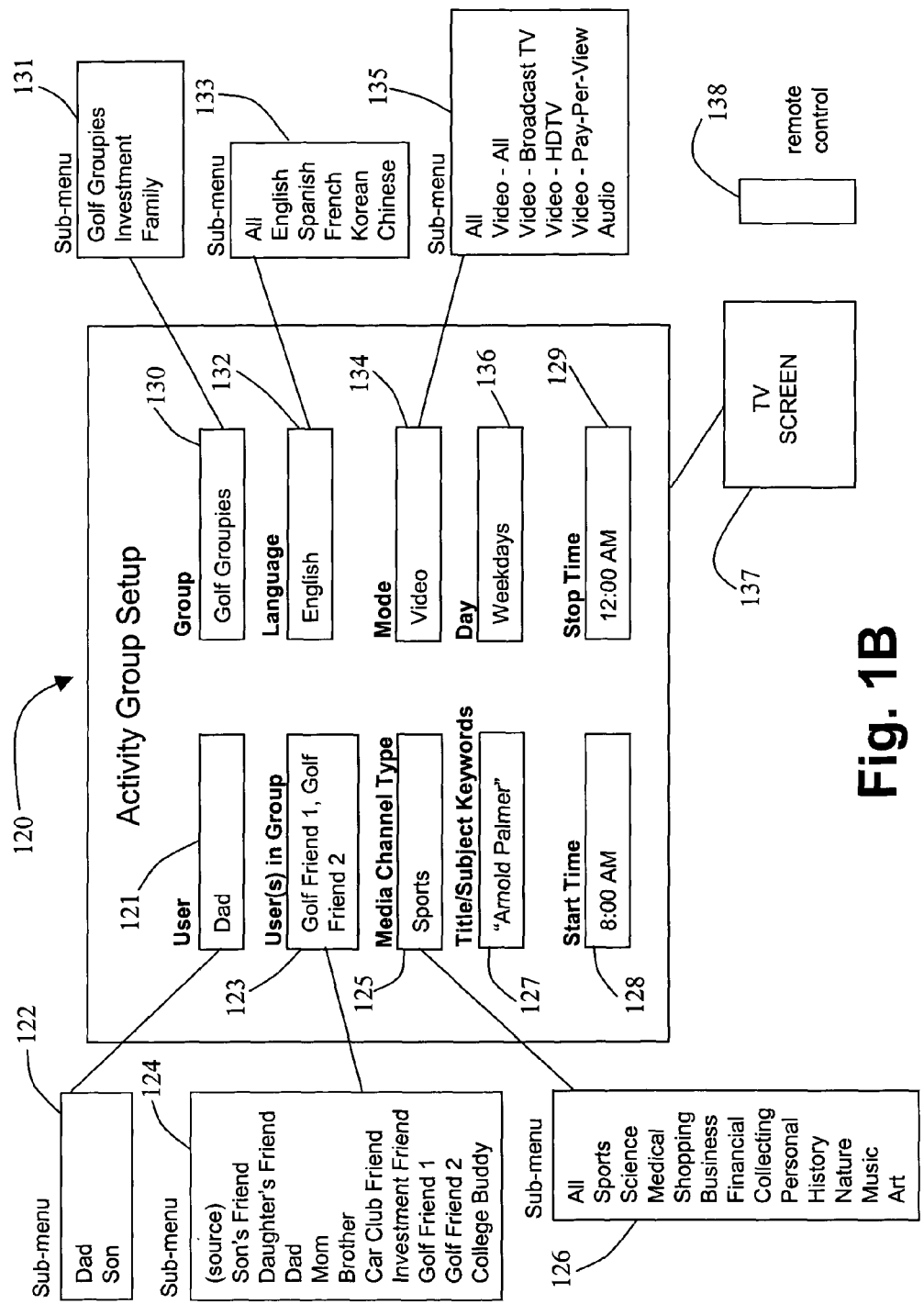
FIG. 1B is a diagram illustrating an embodiment of an exemplary activity group setup screen that may be used to enable communication of user activity information in a MPS such as the MPS's of FIG. 1A, or a PC, such as the PC of FIG. 1A, in accordance with the present invention.

FIG. 1B is a diagram illustrating an embodiment of an exemplary activity group setup screen 120 that may be used to enable communication of user activity information in a MPS such as the MPS's 102 or 106 of FIG. 1A, or a PC, such as the PC 104 of FIG. 1A, in accordance with the present invention. As described above, each MPS 102 or 106, or PC 104, may have a variety of users, each of whom may have a number of interests that may be shared with friends, family, co-workers, and in some cases, total strangers. In order to permit users with common interests to participate in media channel presentations as part of an interactive group, the media exchange network 100 and in particular, the MPS 102 or MPS 106, or the PC 104, may permit users to transmit to one or more other users of media exchange network 100 information about the sending user's media exchange network activity.

The diagram of FIG. 1B illustrates a few of the parameters that may be used in selecting the recipients of user activity information, and the conditions under which the activity information will be shared, in an embodiment in accordance with the present invention. Such an embodiment may support the sharing of activity information by more than one user of an MPS or PC. Also, using the activity group setup screen 120 of FIG. 1B, each of the users of an MPS or a PC, such as the MPS 102 and the PC 104 of FIG. 1A, may define a number of activity groups, each activity group related to a particular interest.

For example, in the illustration of FIG. 1B, the user parameter 121 of the activity group setup screen 120 has been set to "Dad". This value was selected from the sub-menu of users 122 of the MPS 102 or the PC 104 ("Dad" and "Son") who have established activity groups. In addition, the group parameter 130 has been set to "Golf Groupies", a value selected from "Dad's" activity group sub-menu 131. The remainder of the fields shown in the activity group setup screen 120 show the values that "Dad" has set for the respective parameters. For example, "Dad" included two friends, "Golf Friend 1" and "Golf Friend 2", in the "User(s) in Group" parameter 123, selected from the sub-menu 124 corresponding to other media exchange network subscribers that are candidates for inclusion in a group. Subscribers in media exchange network 100 of FIG. 1A may be identified by a legal name, a given name, a screen name, an alias, a user identifier, a network identifier, an electronic serial number, an Internet protocol (IP) address, a media access control (MAC) address, or the like. Note that sub-menu 124 also includes a designator that permits automatic notification of the source of any consumed media. The two friends listed, who are also media exchange network subscribers, share "Dad's" interest in golf and in particular, his interest in information about the golf player "Arnold Palmer". User "Dad", however, does not want these two friends to be aware of all of his media exchange network activity. To restrict notification of "Golf Friend 1" and "Golf Friend 2" only to those instances where "Dad" is accessing media exchange network media channel sports materials related to "Arnold Palmer", user ("Dad") has selected a media channel type parameter 125 value of "Sports" from sub-menu 126, and has set the title/subject keywords parameter 127 to "Arnold Palmer".

Continuing with respect to FIG. 1B, user "Dad" has decided to notify his friends of his media exchange network activity only between 8:00 AM (via the start time parameter 128) and 12:00 AM (via the stop time parameter 129), on weekend days (via the day parameter 136). In addition, user "Dad" has chosen to notify this activity group only when the mode of the media channel program is a form of video, having selected the mode parameter 134 value of "Video-All" from sub-menu 135. He has also selected the language of the media channel presentation ("English") using the language parameter 132 and sub-menu 133. As can be seen in FIG. 1B, an embodiment in accordance with the present invention provides a user with a flexible set of controls to selectively share knowledge of their media exchange network activity.

FIG. 1C illustrates an exemplary activity groups list screen 140 showing the activity groups defined for several users of an MPS such as the MPS 102 of FIG. 1A, in accordance with an embodiment of the present invention. Four groups have been defined in the illustration of FIG. 1C. Three of the groups belong to user "Dad": a "Golf Groupies" group 141, an "Investment" group 142, and a "Family" group 144. In addition, user "Son" has defined a "Skateboarders" group 143. Each of the listed activity groups 141, 142, 143, and 144 define a set of conditions under which the activity information of the corresponding user will be shared, and the identities of the media exchange network subscribers with whom it will be shared. Although the illustrations of FIGS. 1B and 1C show the use of only nine parameters, the present invention is not limited in this regard. An embodiment of the present invention may employ a greater, a lesser, or a completely different complement of parameters in controlling the sharing of activity information in a media exchange network, without departing from the spirit of the present invention. In an embodiment of the present invention, an activity group list showing the activity groups of all users of a MPS or PC, such as that shown in the illustration of FIG. 1C, may be provided only to the administrator of the MPS or the PC, with each user able to view only their own activity groups. In an alternative embodiment, a non-administrative user may be permitted see all activity groups, but permitted to modify only their own entries.

Returning briefly to FIG. 1B, an embodiment in accordance with aspects of the present invention may permit an authorized and authenticated user to establish or modify the parameters used in the sharing of activity information for a given user of an MPS or a PC, such as the MPS 102 or the PC 104 of FIG. 1A, either directly or remotely. This may be accomplished directly using, for example, the TV screen 137 and remote control 138 of FIG. 1B that may be connected to a MPS, such as the MPS 102 of FIG. 1A. The setup or modification of activity groups may also be performed directly on a PC, such as PC 104 of FIG. 1A, via the keyboard, mouse, and monitor (not shown) that may be connected to the PC 104. Activity groups may be defined and configured remotely using another MPS, such as MPS 106 of FIG. 1A, via media exchange network infrastructure 108, or via a remote PC, such as PC 104, via the Internet. For example, a parent acting as administrator of a MPS or a PC may use a remote MPS or PC to create or modify an activity group. This may be useful to permit a family member who does not have authorization to create an activity group to participate in a group media viewing activity when the administrator parent is away from the MPS.

In another embodiment in accordance with the present invention, activity information related to the consumption of media channel programming may be sent directly or indirectly to the media provider. This may allow the media provider to supplement the viewing/listening experience by making available additional or alternate program materials related to those already accessed by the user. In doing so, the media provider is able to keep the appearance of a media channel "fresh" to those that have previously viewed/listened to a media channel offering. In addition, the media provider may provide rewards or incentives, such as coupons, viewing points, or the like, based upon the activity information.

Figure 2A:
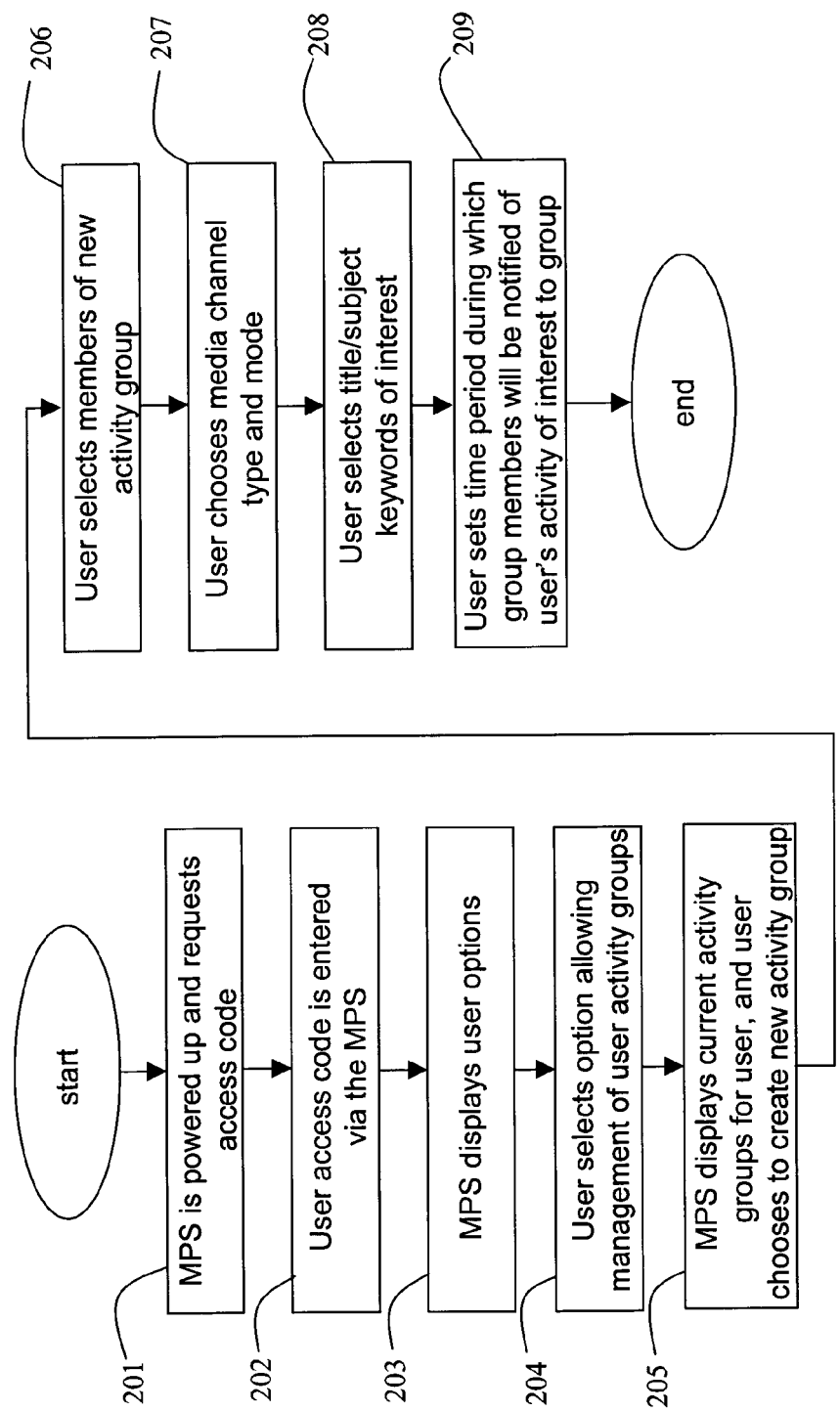
FIG. 2A is a flowchart illustrating an exemplary method of configuring an activity group in an embodiment in accordance with the present invention.

FIG. 2A is a flowchart illustrating an exemplary method of configuring an activity group in an embodiment in accordance with the present invention. Although the following discussion refers to a MPS such as the MPS 102 of FIG. 1A, FIG. 2A applies equally to a PC, such the PC 104 of FIG. 1A. In the illustration of FIG. 2A, the method begins when the user powers up the MPS and the MPS prompts the user for the entry of an access code (block 201). The user then enters an access code (block 202), and the MPS displays the options available to that user (block 203). In the example of FIG. 2A, the user selects the option for the management of activity groups (block 204).

The MPS then displays a current list of activity groups known to the MPS, and the user chooses to create a new activity group (block 205). The user then selects the members of the new activity group (block 206). In addition, the user designates the media channel type and mode (block 207), and selects an appropriate set of title/subject keywords to be used to determine when information is to be sent to the members of the activity group (block 208). The user also sets the time period (e.g., time-of-day, days-of-the-week) during which sharing of activity information may occur (block 209).

Figure 2B:
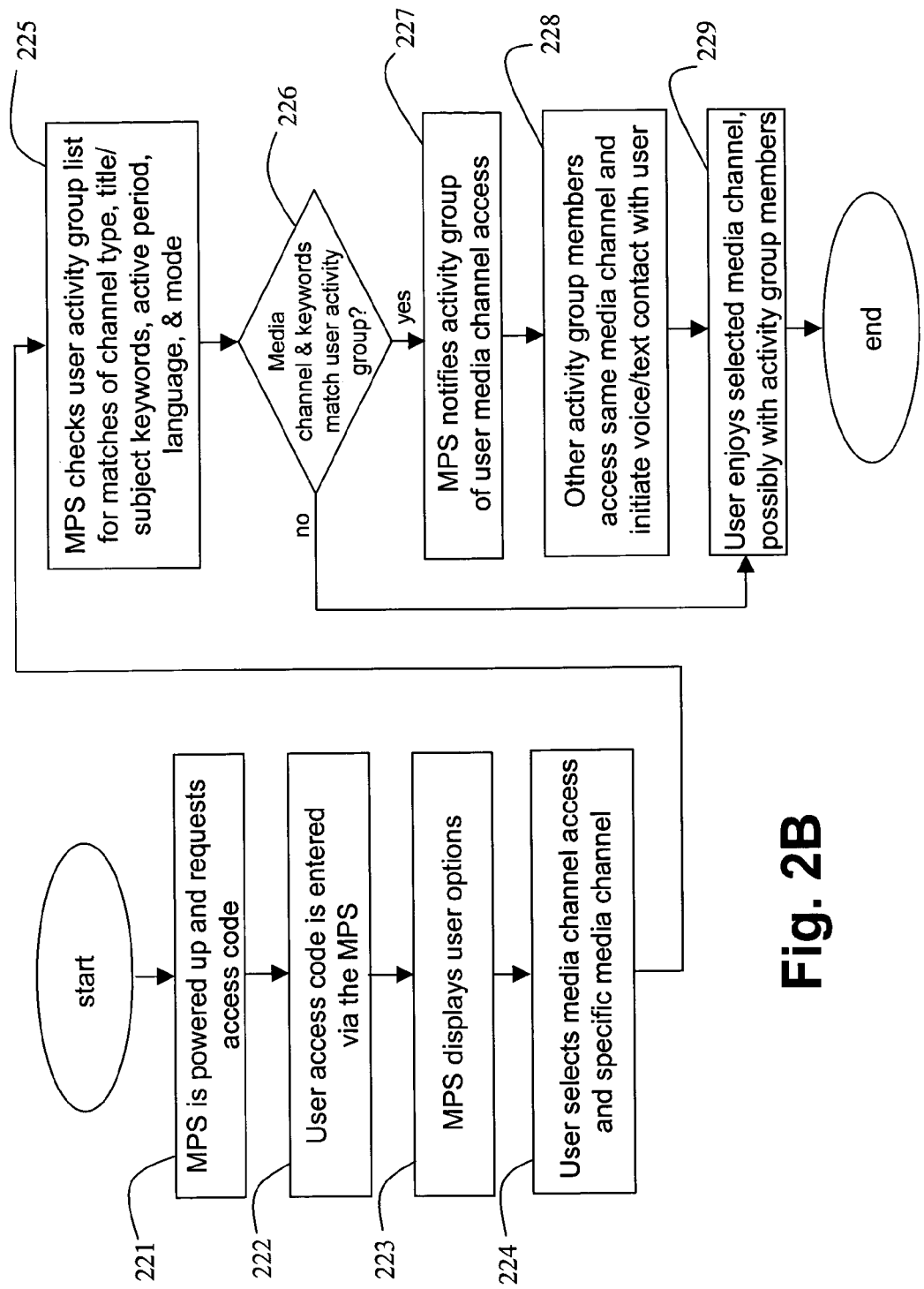
FIG. 2B is a flowchart illustrating an exemplary method of communicating user activity information in an embodiment of a media exchange network in accordance with the present invention.

FIG. 2B is a flowchart illustrating an exemplary method of communicating user activity information in an embodiment of a media exchange network in accordance with the present invention. As in FIG. 2A, the following discussion is made with respect to a MPS, such as MPS's 102 or 106 of FIG. 1A, but applies equally to a PC on which the media exchange software platform is running, such as the PC 104 of FIG. 1A. The communication of user activity information begins after the MPS or PC is turned on, and the MPS displays a prompt requesting the entry of a user access code (block 221). The user then enters an access code via the MPS (block 222), and the MPS displays the current options available to the user (block 223). The user then selects media channel access, and chooses the specific media channel to be listened to or viewed (block 224). The MPS then determines if the selected media channel matches the media channel type of any activity group list entry for the user, and checks for a match of title and/or subject keywords, the current time, the selected language, and the media channel mode (block 225). If an entry belonging to the user matches an activity group list entry (block 226), the MPS notifies via the media exchange network, the activity group members identified in the activity group list entry (block 227). Information identifying the user and the selected media exchange network activity is included in the notification. Upon receiving the notification of the media exchange network activity of the user, the members of the activity group may elect to participate in an interactive media exchange network session, and may initiate contact with the user (block 228). The user proceeds to view or listen to the selected media channel program, whether or not a matching user activity group list entry is found (block 226), and without regard to whether any notified activity group list members choose to participate (block 229).

A major challenge is to be able to transfer and share many different types of digital media, data, and services between one device/location and another with ease while being able to index, manage, and store the digital media and data.

For example, it is desirable to be able to distribute and store many types of digital media in a PC and/or television environment in a user-friendly manner without requiring many different types of software applications and/or unique and dedicated interfaces. Any networking issues or other technical issues should be transparent to the users. It is also desirable to take advantage of existing hardware infrastructure, as much as possible, when providing such capability.

In an embodiment of the present invention, a media exchange network is provided that enables many types of digital media, data, and/or services to be stored, indexed, viewed, searched for, pushed from one user to another, and requested by users, using a media guide user interface. The media exchange network also allows a user to construct personal media channels that comprise his personal digital media (e.g., captured digital pictures, digital video, digital audio, etc.), request that third-party media channels be constructed from third-party digital media, and access the media channels pushed to him by other users on the media exchange network.

PC's may be used but are not required to interface to the media exchange network for the purpose of exchanging digital media, data, and services. Instead, set-top-boxes or integrated MPS's (media processing systems) may be used with the media exchange network to perform all of the previously described media exchange functions using a remote control with a television screen.

Current set-top-boxes may be software enhanced to create a MPS that provides full media exchange network interfacing and functionality via a TV screen with a TV guide look-and-feel. PC's may be software enhanced as well and provide the same TV guide look-and-feel. Therefore, the media exchange network supports both PC's and MPS's in a similar manner. Alternatively, a fully integrated MPS may be designed from the ground up, having full MPS capability.

In the case of an MPS configuration, the user takes advantage of his remote control and TV screen to use the media exchange network. In the case of a PC configuration, the user takes advantage of his keyboard and/or mouse to use the media exchange network.

An MPS or enhanced PC is effectively a storage and distribution platform for the exchange of personal and third party digital media, data, and services as well as for bringing the conventional television channels to a user's home. An MPS and/or PC connects to the media exchange network via an existing communication infrastructure which may include cable, DSL, satellite, etc. The connection to the communication infrastructure may be hard-wired or wireless.

The media exchange network allows users to effectively become their own broadcasters from their own homes by creating their own media channels and pushing those media channels to other authorized users on the media exchange network, such as friends and family members.

Figure 3:
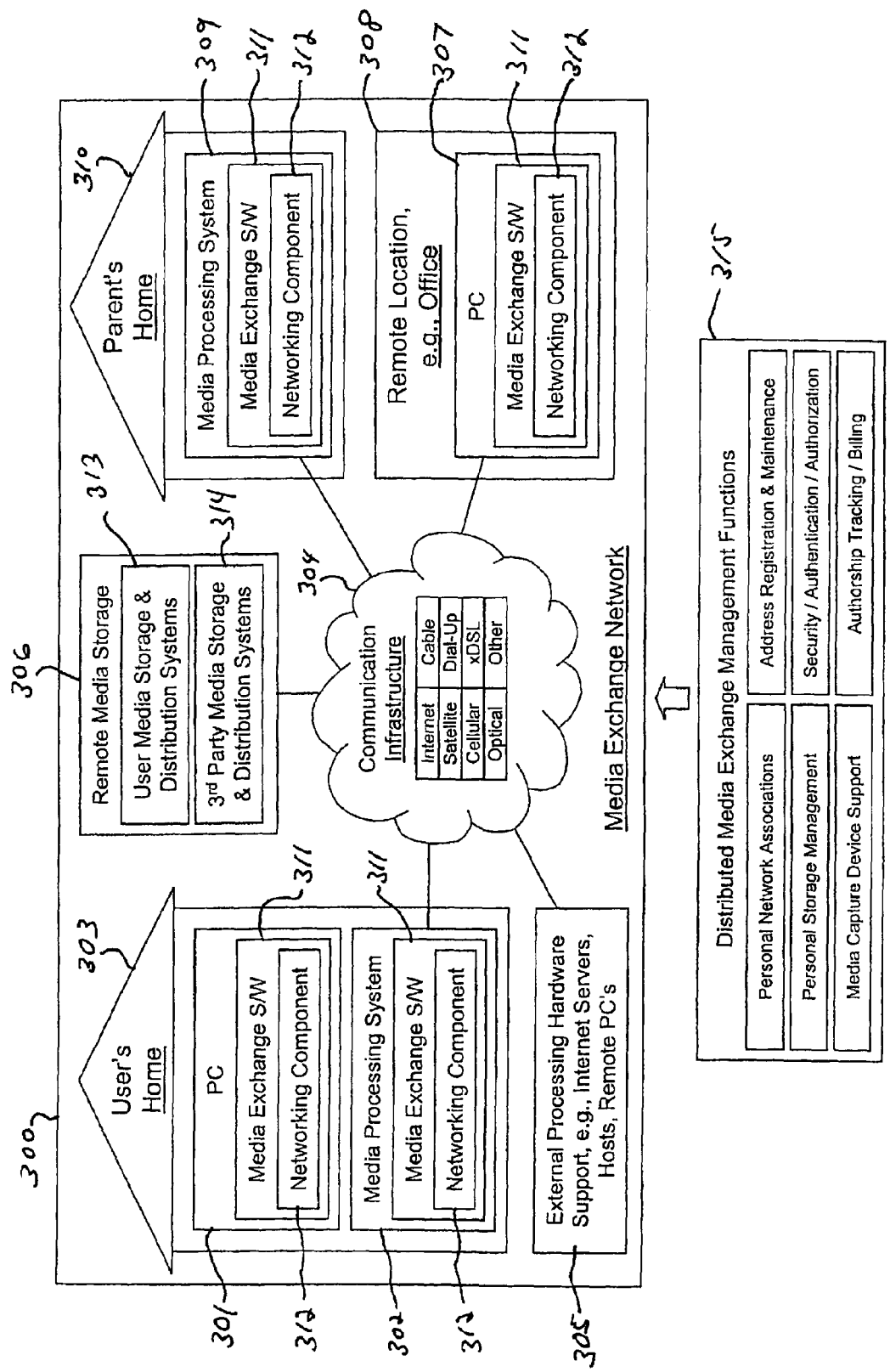
FIG. 3 is a schematic block diagram of a first exemplary media exchange network in accordance with an embodiment of the present invention.

FIG. 3 comprises a media exchange network 300 for exchanging and sharing digital media, data, and services in accordance with an embodiment of the present invention. The media exchange network 300 is a secure, closed network environment that is only accessible to pre-defined users and service providers. The media exchange network of FIG. 3 comprises a first PC 301 and a first media processing system (MPS) 302 at a user's home 303, a communication infrastructure 304, external processing hardware support 305, remote media storage 306, a second PC 307 at a remote location 308 such as an office, and a second MPS 309 at a parent's home 310.

The PC's 301 and 307 and the MPS's 302 and 309 each include a media exchange software (MES) platform 311 and a networking component 312 for connectivity. The MES platform 311 provides multiple capabilities including media "push" capability, media "access" capability, media channel construction/selection, image sequence selection, text and voice overlay, channel and program naming, inter-home routing selection, authorship and media rights management, shared inter-home media experience, billing service, and an integrated media guide interface providing a TV channel guide look-and-feel.

The external processing hardware support 305 comprises at least one server such as a centralized internet server, a peer-to-peer server, or cable head end. The server may alternatively be distributed over various hosts or remote PC's. The MES platform 311 may also reside on the external processing hardware support server 305. The remote media storage 306 may comprise user media storage and distribution systems 313 and/or third party media storage and distribution systems 314.

The communication infrastructure 304 may comprise at least one of internet infrastructure, satellite infrastructure, cable infrastructure, dial-up infrastructure, cellular infrastructure, xDSL infrastructure, optical infrastructure, or some other infrastructure. The communication infrastructure 304 links the user's home 303, parent's home 310, remote media storage 306, and remote location office 308 to each other (i.e., the communication infrastructure 304 links all users and service providers of the media exchange network 300).

The various functions 315 of the media exchange network 300 comprise generating personal network associations, personal storage management, media capture device support, security/authentication/authorization support, authorship tracking and billing and address registration and maintenance. These media exchange management functions 315 may be distributed over various parts of the media exchange network 300. For example, the personal network associations and personal storage management functions may be integrated in the PC 301 at the user's home 303.

Figure 4:
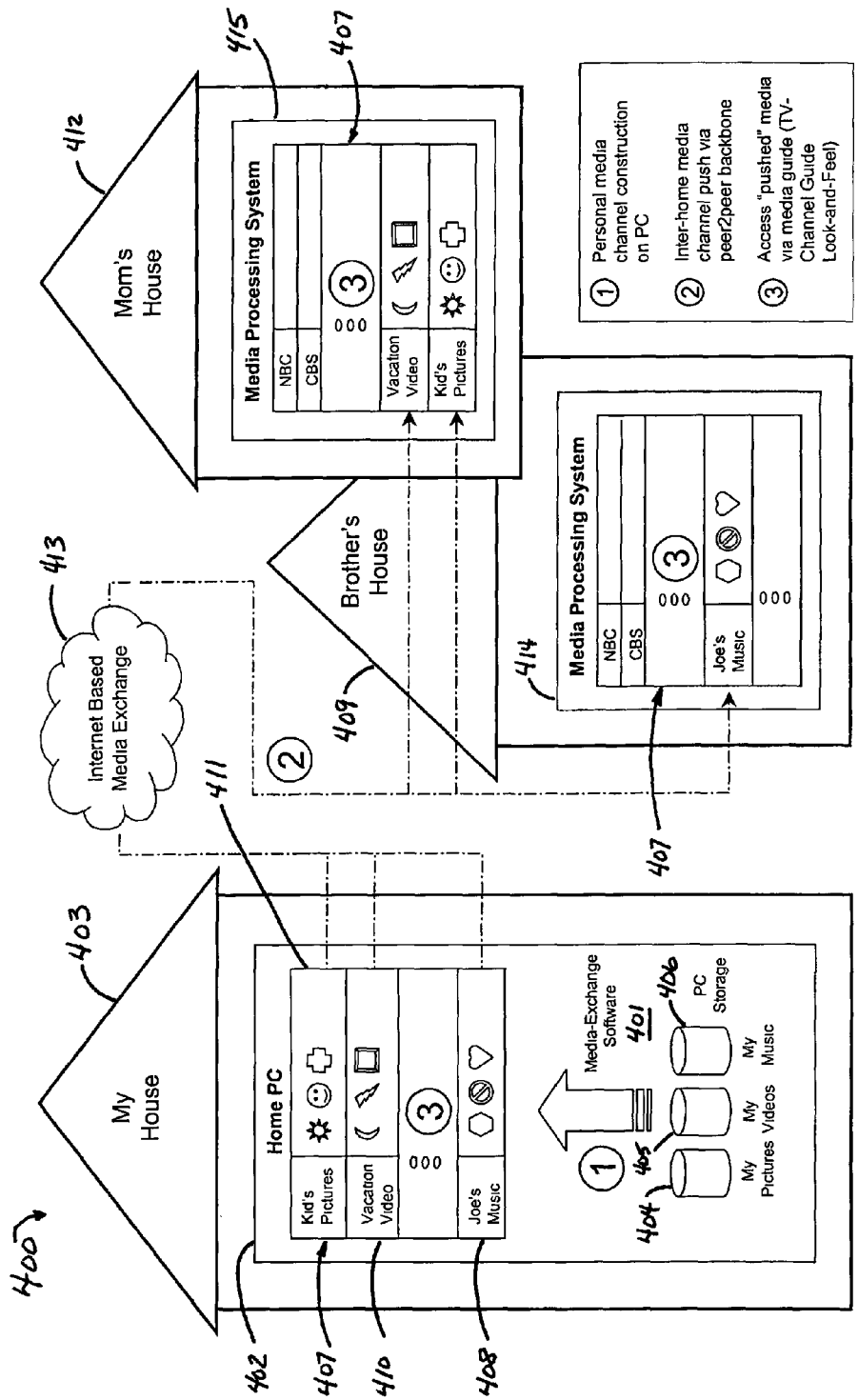
FIG. 4 is a schematic block diagram of performing personal media exchange over a second exemplary media exchange network in accordance with an embodiment of the present invention.

FIG. 4 illustrates an example of personal media exchange over a media exchange network 400 in accordance with an embodiment of the present invention. In step 1, the media exchange software (MES) platform 401 is used to construct personal media channels on a PC 402 by a user at "my house" 403. For example, with various media stored on the PC 402 such as digital pictures 404, videos 405, and music 406, the MES platform 401 allows the digital media to be organized by a user into several channels having a media guide user interface 407 on the PC 402.

In step 2, the user at "my house" 403 pushes a media channel 408 (e.g., "Joe's Music") to "brother's house" 409 and pushes two media channels 410 and 411 (e.g., "Vacation Video" and "Kid's Pictures") to "Mom's house" 412 via a peer-to-peer server 413 over the internet-based media exchange network 400. "Brother's house" 409 includes a first MPS 414 connected to the media exchange network 400. "Mom's house" 412 includes a second MPS 415 connected to the media exchange network 400. The MPS's 414 and 415 also provide a media guide user interface 407.

In step 3, brother and/or Mom access the pushed media channels via their respective media processing systems (MPS's) 414 and 415 using their respective MPS TV screens and remote controls.

Figure 5:
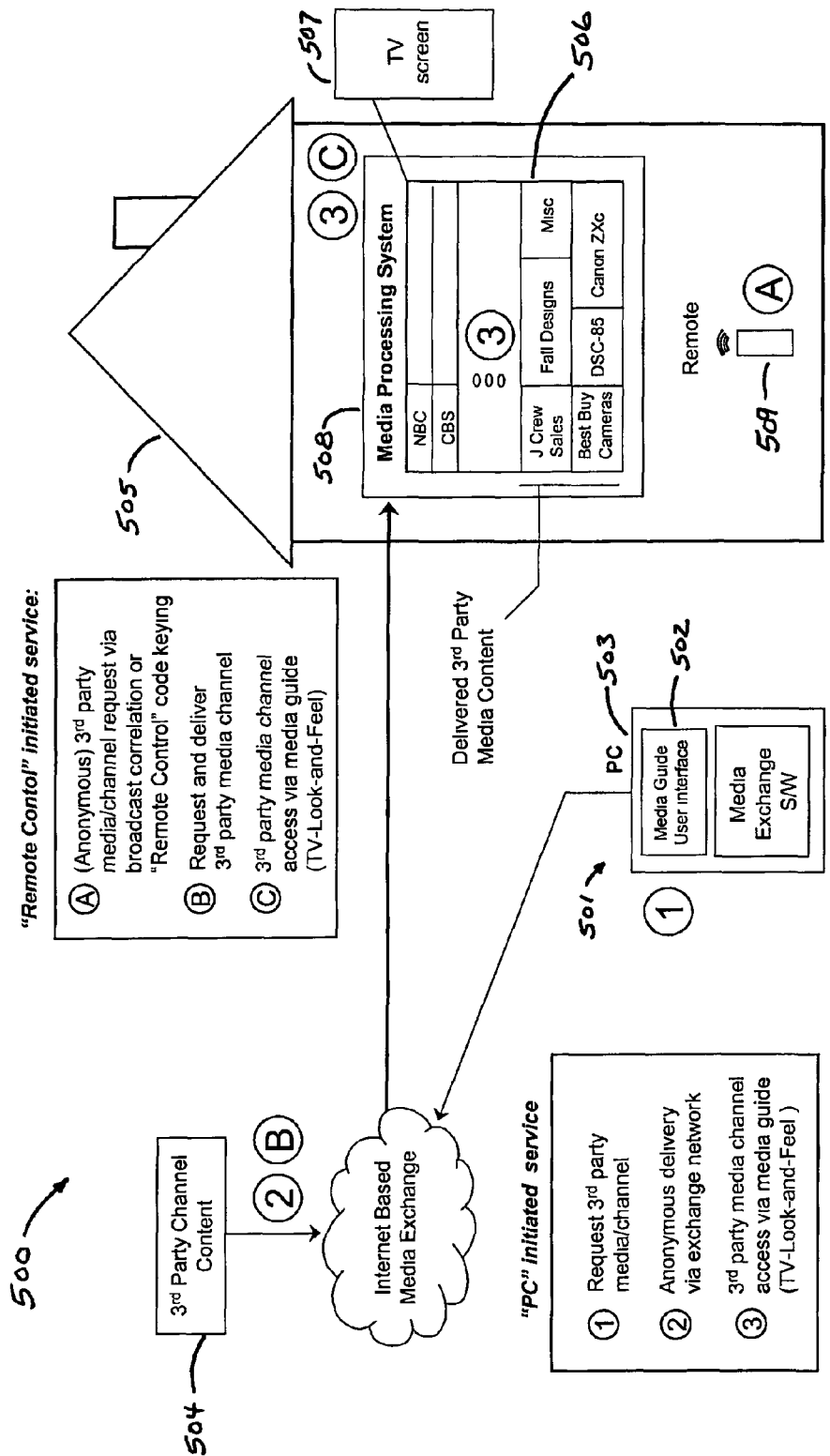
FIG. 5 is a schematic block diagram of performing third-party media exchange over a third exemplary media exchange network in accordance with an embodiment of the present invention.

FIG. 5 illustrates an example of third-party media exchange over a media exchange network 500 in accordance with an embodiment of the present invention. In step 1, a PC-initiated third-party request is made by a first party 501 via an internet-based media exchange network 500 using a media guide user interface 502 on a PC 503. In step 2, an anonymous delivery of the requested third-party channel 504 is made to a second party 505 via the internet-based media exchange network 500. In step 3, the second party 505 accesses the third-party channel 504 using a media guide user interface 506 on a TV screen 507 that is integrated into an MPS 508.

Similarly, in step A, an MPS-initiated third-party request is made by a second party 505 via an internet-based media exchange network 500 using a media guide user interface 506 on a TV screen 507 using a remote control 509. The second party 505 may key in a code, using his remote control 509, that is correlated to a commercial or some other third party broadcast media. In step B, an anonymous delivery of the requested third-party channel 504 is made to a first party 501 via the internet-based media exchange network 500. In step C, the first party 501 accesses the third-party channel 504 using a media guide user interface 502 on a PC 503.

Figure 6:
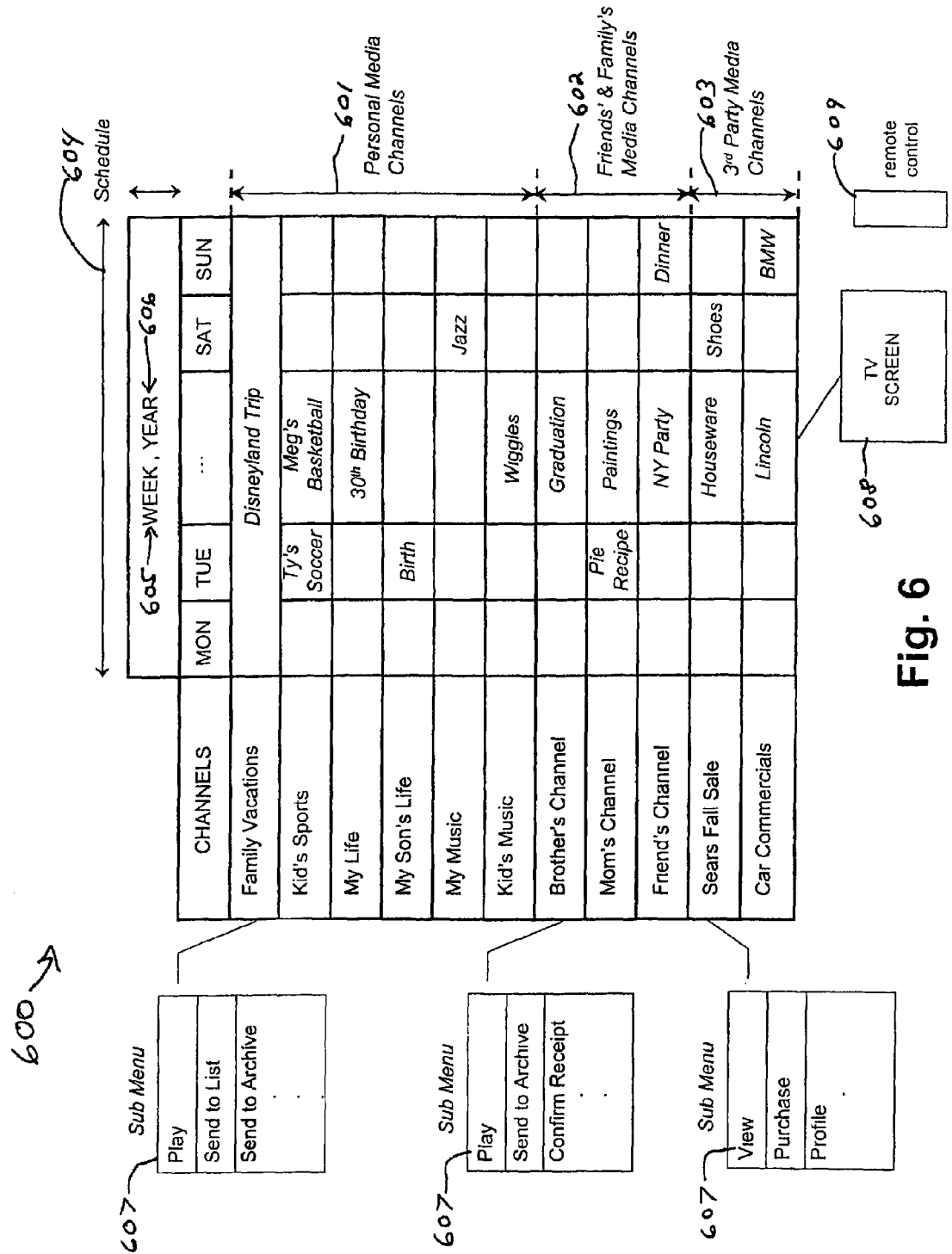
FIG. 6 is an exemplary illustration of a media guide user interface in accordance with an embodiment of the present invention.

FIG. 6 illustrates a media guide user interface 600 in accordance with an embodiment of the present invention. The media guide user interface 600 may be displayed on a TV screen 608 and controlled by a remote control device 609. Also, the media guide user interface 600 may be displayed on a PC monitor and controlled by a keyboard or mouse.

The media guide user interface 600 may be configured not only for conventional TV channels but also for personal media channels 601 that are constructed by a user of a media exchange network, friend's and family's media channels 602 constructed by friends and family, and third party channels 603 that are constructed by third parties either upon request by a user of a media exchange network or based on a profile of a user.

The personal media channels 601 may include, for example, a "family vacations channel", a "kid's sports channel", a "my life channel", a "son's life channel", a "my music channel", and a "kid's music channel". The friends and family media channels 602 may include, for example, a "brother's channel", a "Mom's channel", and a "friend's channel". The third party media channels 603 may include, for example, a "Sears Fall sale channel" and a "car commercials channel".

Each media channel may correspond to a schedule 604 showing, for example, a week 605 and a year 606. For example, under the "kid's sports channel", Ty's soccer game could be scheduled to be viewed on Tuesday of the current week 605 and current year 606. For each media channel, a sub-menu 607 allows for selection of certain control and access functions such as "play", "send to list", "send to archive", "confirm receipt", "view", "purchase", and "profile".

Figure 7:
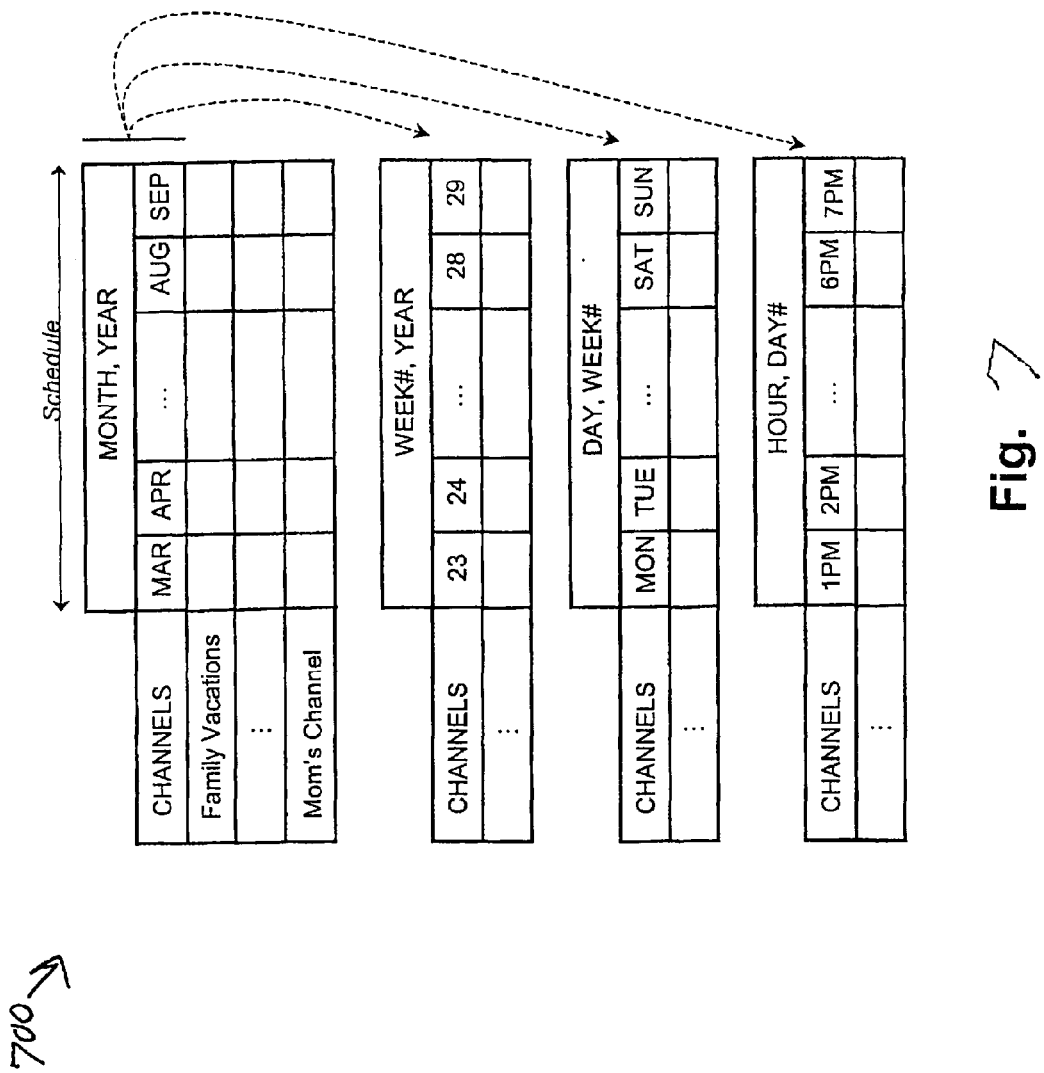
FIG. 7 is an exemplary illustration of several instantiations of a media guide user interface of FIG. 4 in accordance with an embodiment of the present invention.

FIG. 7 illustrates possible multiple instantiations of a media guide user interface 700 in accordance with an embodiment of the present invention. The media guide user interface 700 may be viewed with a schedule having formats of, for example, "month, year", "week#, year", "day, week#", or "hour, day".

Referring to FIG. 8, a user of a media exchange network may push a media channel (e.g., "Vacation in Alaska Video") to a friend who is on the same media exchange network. The media guide user interface 800 may give the friend several options 801 for how to accept and download the pushed media in accordance with an embodiment of the present invention.

For example, a first, most expensive option 803 may be "Express Delivery" which would deliver the pushed media to the friend in 18 minutes using queuing and cost $1.20, for example. The pushed media may be stored in a file in an MPEG 2 format that was recorded at a rate of 4 Mbps, for example. Queuing comprises buffering and delivering a previous part of the media and then buffering and delivering a next part of the media. For example, a first six minutes of the "Vacation in Alaska Video" may be buffered and delivered first, then a second six minutes may be buffered and delivered next, and so on until the entire media is delivered.

A second, less expensive option 802 may be "Normal Delivery" which would deliver the pushed media in 2 hours and 13 minutes without queuing and cost $0.59, for example. The pushed media may be stored in a file in an MPEG 2 format that was recorded at a rate of 1.5 Mbps, for example.

A third, least expensive option 804 may be "Overnight Delivery" which would deliver the pushed media by the next morning and cost only $0.05, for example. The pushed media may be stored in a file in an MPEG 2 format that was recorded at a rate of 19 Mbps and stored on a server, for example.

Figure 9A:
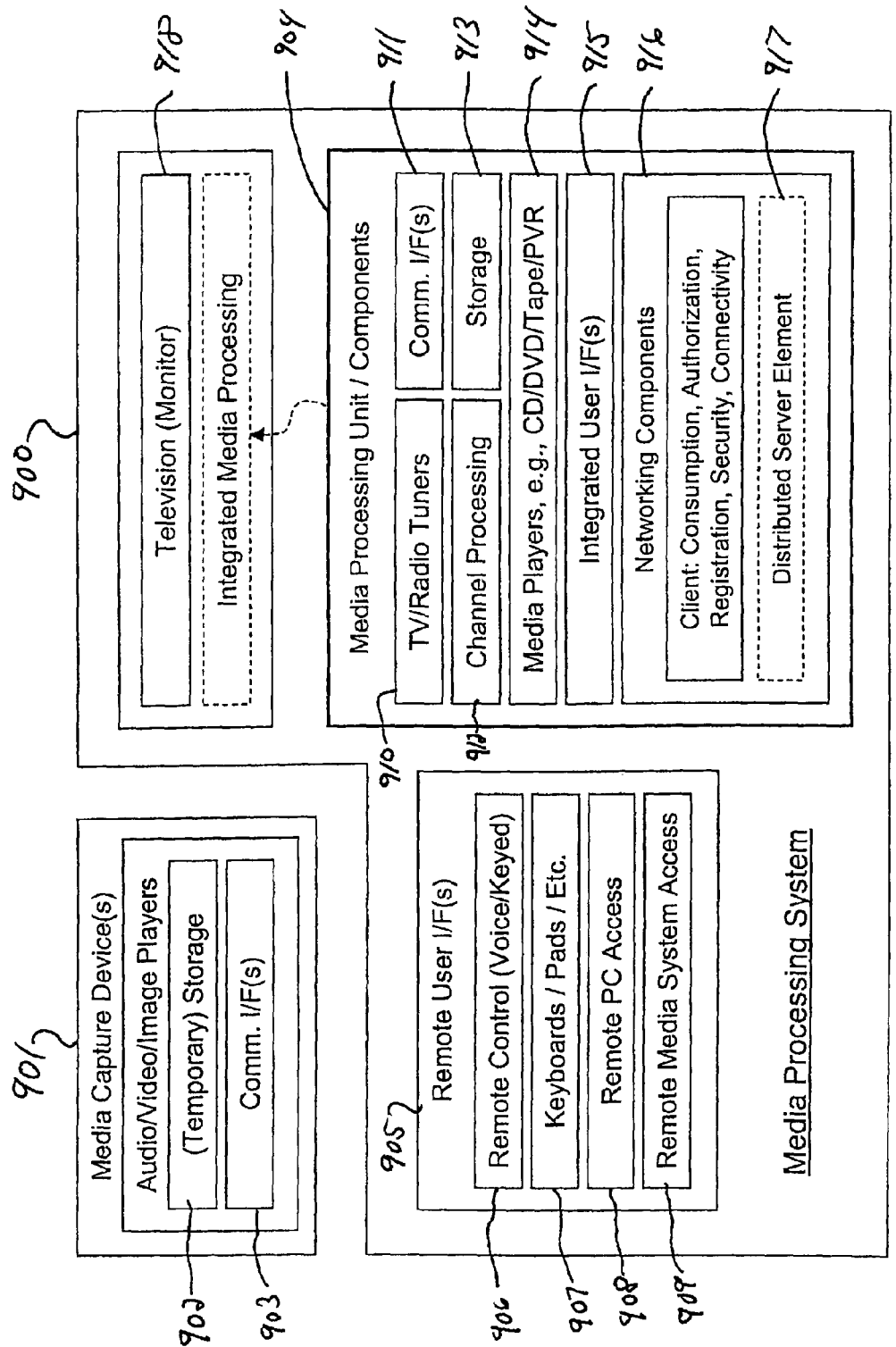
FIG. 9A is a schematic block diagram of a media processing system (MPS) interfacing to media capture peripherals in accordance with an embodiment of the present invention.

FIG. 9A illustrates the detailed elements of a media processing system (MPS) 900 and media capture devices 901 in accordance with an embodiment of the present invention. The media capture devices 901 may comprise audio, video, and image players, such as digital cameras, digital camcorders, and MP3 players, that each include a temporary storage area 902 and a communication interface 903 such as, for example, a USB interface or a wireless interface. The media capture devices 901 have the capability to interface to an MPS and a PC.

The MPS 900 comprises a media processing unit (MPU) 904, remote user interface(s) 905, and a TV screen 918 to provide integrated media processing capability and indirect user interface capability. The remote user interfaces 905 may comprise a voice or keyed remote control 906, keyboards and pads 907, a remote PC access interface 908, and a remote media system access interface 909 (i.e., providing access from another MPS).

The media processing unit (MPU) 904 comprises TV and radio tuners 910 for image and audio consumption, communications interfaces 911, channel processing 912 (creating, storing, indexing, viewing), storage 913, media players 914 (CD, DVD, Tape, PVR, MP3), an integrated user interface 915 (to provide a TV channel guide look-and-feel), networking components 916 to provide client functions such as consumption (billing), authorization (e.g., using digital certificates and digital ID's), registration, security, and connectivity. In an alternative embodiment of the present invention, the networking components 916 may include a distributed server element 917 that is part of a distributed server.

FIG. 9B illustrates an alternative embodiment of a media processing system (MPS) 920 in accordance with various aspects of the present invention. The MPS 920 is essentially an enhanced set-top-box for viewing and interacting with various user interfaces, media, data, and services that are available on the media exchange network using, for example, a remote control. The MPS 920 comprises a media peripheral 921, a MMS (media management system) 922, and a broadband communication interface 923.

The media peripheral 921 may include a TV (television), a PC (personal computer), and media players (e.g., a CD player, a DVD player, a tape player, and a MP3 player) for video, image, and audio consumption of broadcast and/or personal channels. The broadband communication interface 923 may include internal modems (e.g., a cable modem or DSL modem) or other interface devices in order to communicate with, for example, a cable or satellite headend.

The MMS 922 includes a software platform to provide functionality including media "push" capability, media "access" capability, media channel construction/selection, image sequence selection, text and voice overlay, channel and program naming, inter-home routing selection, authorship and media rights management, shared inter-home media experience, billing service, and a media guide user interface providing an integrated TV channel guide look-and-feel.

Figure 10:
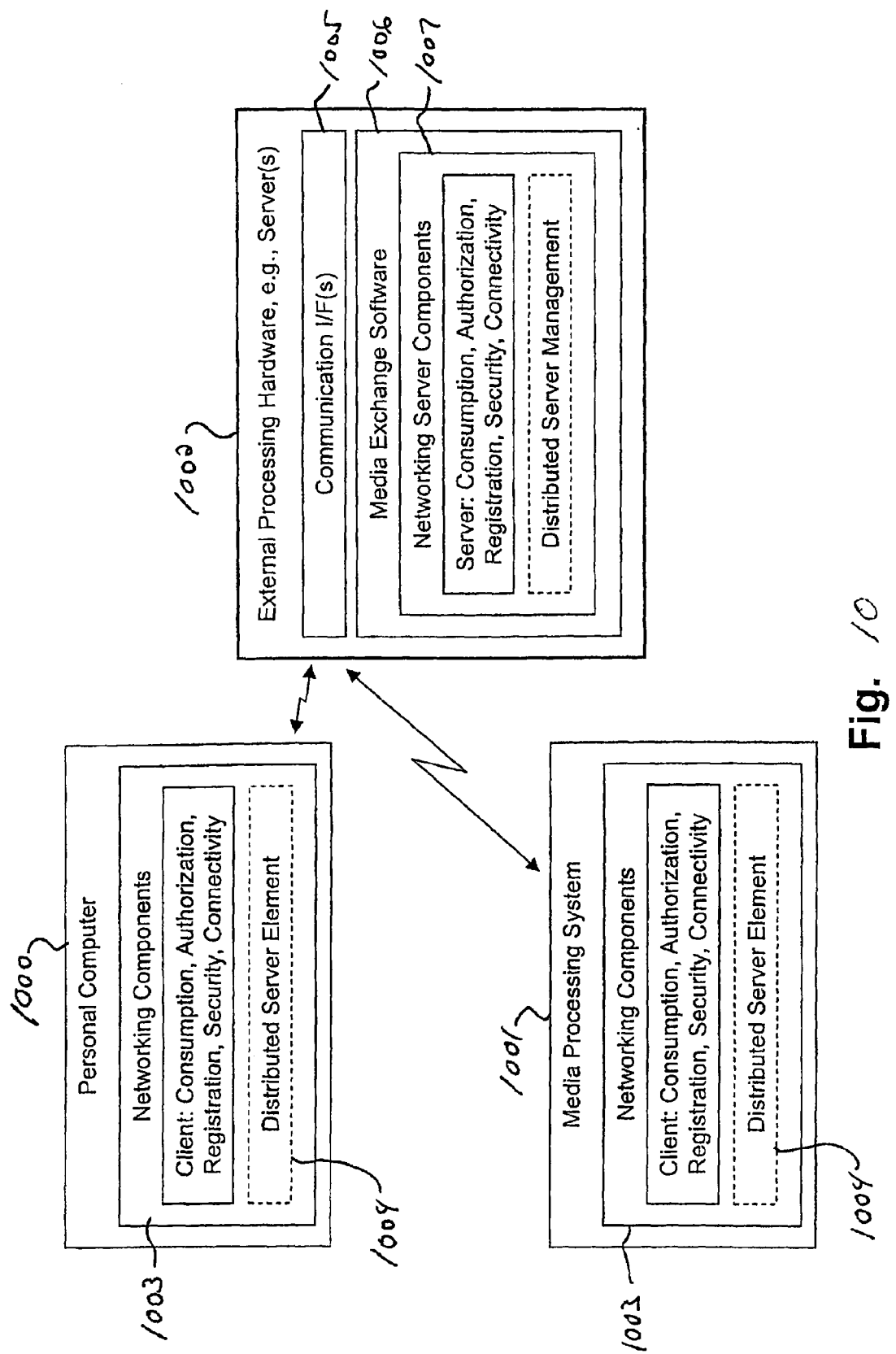
FIG. 10 is a schematic block diagram of a PC and an MPS interfacing to a server on a media exchange network in accordance with an embodiment of the present invention.

FIG. 10 illustrates connectivity between a PC 1000, an MPS 1001, and external processing hardware 1002 (e.g., a server) in accordance with an embodiment of the present invention. The PC 1000 and MPS 1001 include networking components 1003 to provide client functions such as consumption (billing), authorization, registration, security, and connectivity. Alternatively, the PC 1000 and MPS 1001 may include a distributed server element 1004 that is part of a distributed server.

The PC 1000 and MPS 1001 connect to the external processing hardware 1002 via wired or wireless connections. The external processing hardware 1002 comprises a distributed server or peer-to-peer server. The external processing hardware 1002 also comprises communication interfaces 1005 (e.g., cable interfaces, optical interfaces, etc.) and a media exchange software (MES) platform 1006. The MES platform 1006 in the external processing hardware 1002 allows for communication with the PC 1000 and MPS 1001 which may also use the same MES platform 1006. The external processing hardware 1002 also includes networking server components 1007 to provide the similar client functions such as consumption (billing), authorization, registration, security, and connectivity at the server side.

Figure 11:
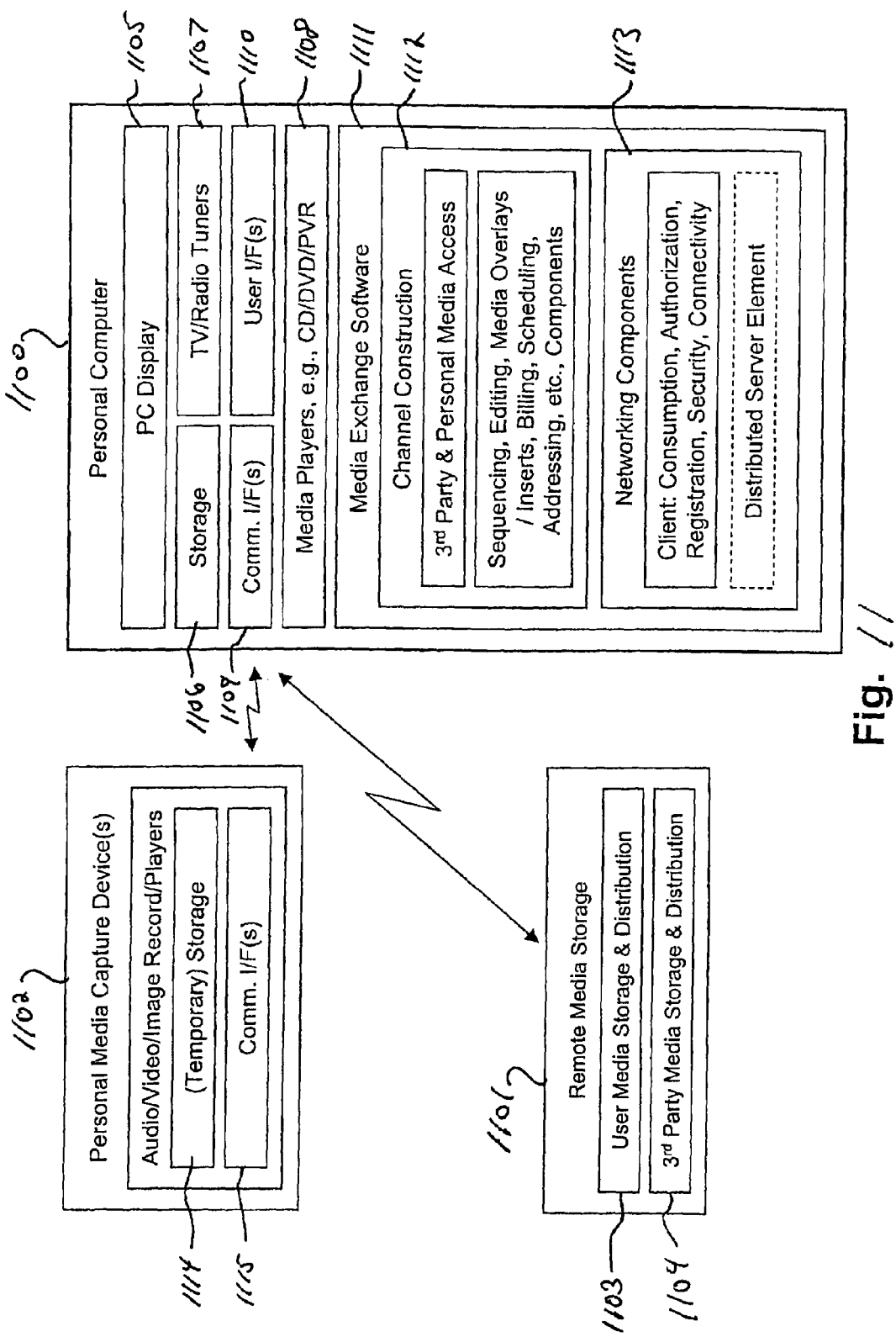
FIG. 11 is a schematic block diagram of a PC interfacing to personal media capture devices and remote media storage on a media exchange network in accordance with an embodiment of the present invention.

FIG. 11 illustrates connectivity between a PC 1100, remote media storage 1101, and personal media capture devices 1102 when the PC 11100 is used as the primary distributor of digital media such as in the case of PC-to-PC operation, in accordance with an embodiment of the present invention. The personal media capture devices 1102 and remote media storage 1101 connect to the PC 1100 via a wireless or wired connection. The remote media storage 1101 provides user media storage and distribution 1103 as well as third party media storage and distribution 1104. The personal media capture devices 1102 provide temporary storage 1114 and communication interfaces 1115.

Viewing is done using a PC monitor 1105 instead of a television screen. The PC 1100 may include storage 1106, TV/radio tuners 1107 for media consumption, media players 1108, and communication interfaces 1109 and user interfaces 1110 similar to those for the MPS of FIG. 9A. The PC 1100 includes a media exchange software (MES) platform 1111 that provides channel construction capability 1112 and networking capability 1113. The channel construction capability 1112 allows third party and personal media access, sequencing, editing, media overlays and inserts, billing, scheduling, and addressing.

Various embodiments of the present invention include a system and method that provide for the communication of user activity information in a media exchange network.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

What is claimed is:

1. A method of communicating activity information to support user interaction in a communication network, the method comprising:
   accepting from a first user information identifying a second user;
   receiving from the first user at least one user-selected characteristic associated with media;
   receiving a media request from the first user via a communication network, wherein the media request relates to media to be sent directly via the communication network from of the second user to the first user;
   processing the media request from the first user via the communication network, the requested media having a pre-defined set of characteristics;
   notifying the second user, via the communication network, of the consumption of the requested media by the first user, if the pre-defined set of characteristics for the requested media matches the at least one user-selected characteristic; and
   refraining from notifying the second user, via the communication network, of the consumption of the requested media by the first user, if the pre-defined set of characteristics for the requested media does not match the at least one user-selected characteristic.

2. The method of claim 1 wherein each of the first user and the second user are associated with one or more of an Internet protocol (IP) address, a media access control (MAC) address, and/or an electronic serial number (ESN).

3. The method of claim 1 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

4. The method of claim 1 wherein the communication network is the Internet.

5. The method of claim 1 wherein the requested media comprises one or more of audio, a still image, video, real time video, and/or data.

6. The method of claim 1 wherein consumption comprises one or more of playing audio, displaying a still image, displaying video, and/or displaying data.

7. The method of claim 1 wherein the information identifying the second user comprises at least one or more of a legal name, a given name, a screen name, a user identifier, a network identifier, an Internet protocol (IP) address, a media access control (MAC) address, and/or an electronic serial number.

8. The method of claim 1 wherein the at least one user-selected characteristic comprises one or more of a title keyword, a subject keyword, a time period, a genre, an artist, a media channel type, a mode, and/or a language.

9. The method of claim 1 wherein the notifying comprises transmitting a message via the communication network.

10. The method of claim 1 further comprising: keeping a record of the notifying; and the record being used by the second user to provide one or both of services and/or incentives to the first user.

11. A method of communicating activity information to support user interaction in a communication network, the method comprising:

associating at least one media characteristic with a user;

processing a direct request for media of another user, from the user, the media having a pre-defined set of characteristics;

sending a notification via a communication network if the pre-defined set of characteristics for the requested media matches the at least one media characteristic; and refraining from sending a notification if the pre-defined set of characteristics for the requested media does not match the at least one media characteristic.

12. The method of claim 11 wherein the requested media comprises one or more of audio, a still image, video, real time video, and/or data.

13. The method of claim 11 wherein the at least one media characteristic comprises one or more of a title keyword, a subject keyword, a genre, an artist, a time period, a media channel type, a mode, and/or a language.

14. The method of claim 11 wherein the pre-defined set of characteristics comprises at least one media characteristic.

15. The method of claim 11 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

16. A method of communicating activity information to support user interaction in a communication network, the method comprising:

notifying a first user, via a communication network, of consumption of requested media of the first user directly requested by a second user, if a pre-defined set of characteristics for the requested media matches at least one user-selected media characteristic; and refraining from notifying the first user, via the communication network, of the consumption of the requested media by the second user, if the pre-defined set of characteristics for the requested media does not match the at least one user-selected media characteristic.

17. The method of claim 16 wherein each of the first user and the at least a second user are associated with one or more of an Internet protocol (IP) address, a media access control (MAC) address, and/or an electronic serial number (ESN).

18. The method of claim 16 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

19. The method of claim 16 wherein the communication network is the Internet.

20. The method of claim 16 wherein the requested media comprises one or more of audio, a still image, video, real time video, and/or data.

21. The method of claim 16 wherein consumption comprises one or more of playing audio, displaying a still image, displaying video, and/or displaying data.

22. The method of claim 16 wherein the at least one user-selected characteristic comprises one or more of a title keyword, a subject keyword, a time period, a genre, an artist, a media channel type, a mode, and/or a language.

23. The method of claim 16 wherein the notifying comprises transmitting a message via the communication network.

24. The method of claim 16 further comprising: keeping a record of the notifying; and the record being used by the second user to provide one or both of services and/or incentives to the first user.

25. A system supporting the communication of activity information to support user interaction in a communication network, the system comprising:

a first set top box circuitry at a first location configured to support consumption of media by a first user; and software that notifies a second user at a second location, via a communication network, of the consumption of media of the second user directly requested and consumed by the first user if a pre-defined set of media characteristics for requested media match at least one user-selected media characteristic associated with the first user, and that refrains from notifying the second user at the second location, via the communication network, of the consumption of media of the second user by the first user of the pre-defined set of media characteristics for the requested media does not match the at least one user-selected media characteristic associated with the first user.

26. The system of claim 25 wherein the media comprises one or more of audio, a still image, video, real time video, and/or data.

27. The system of claim 25 wherein consumption comprises one or more of playing audio, displaying a still image, displaying video, and/or displaying data.

28. The system of claim 25 wherein the communication network comprises one or more of a cable infrastructure, a satellite network infrastructure, a digital subscriber line (DSL) infrastructure, an Internet infrastructure, an intranet infrastructure, a wired infrastructure, and/or a wireless infrastructure.

29. The system of claim 25 wherein the software comprises server software at a location separate from the first location and the second location.

30. The method of claim 25 wherein the media characteristic comprises one or more of a title keyword, a subject keyword, a genre, an artist, a time period, a media channel type, a mode, and/or a language.

* * * * *